July 20, 1937.  F. E. PROAL  2,087,446
SLIDE RULE FOR USE IN GEAR CALCULATIONS
Filed May 12, 1936  2 Sheets-Sheet 2
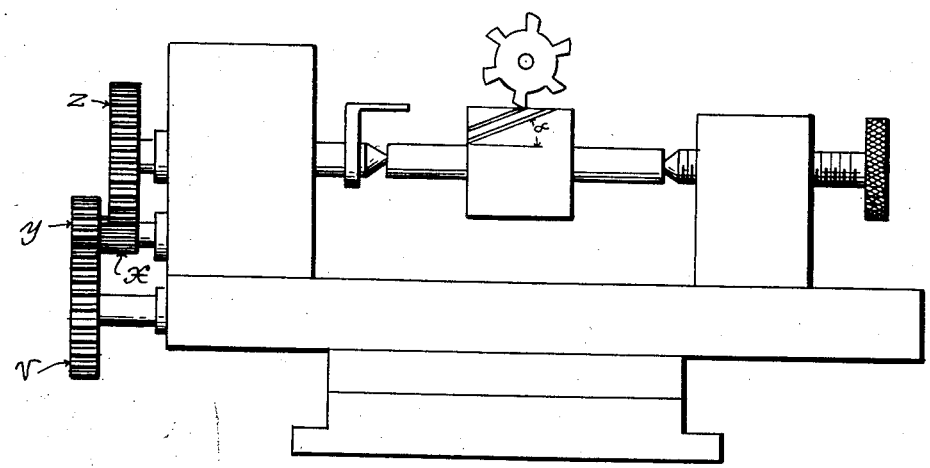
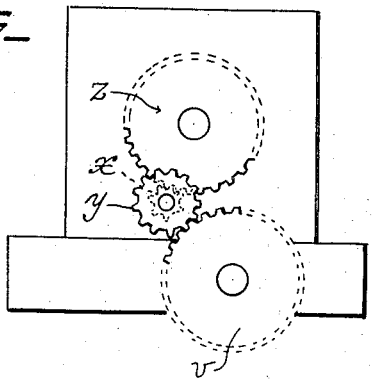
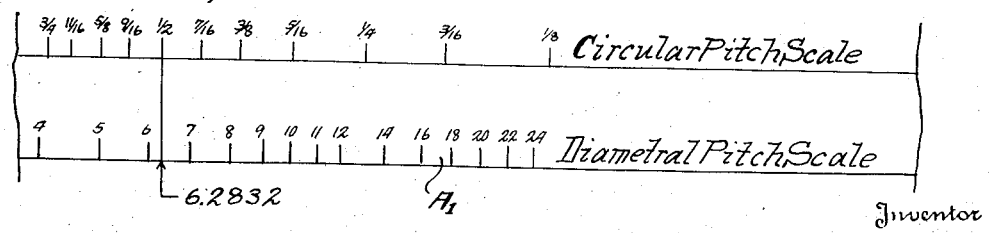
Inventor
F. E. Proal
By Watson E. Coleman
Attorney Patented July 20, 1937

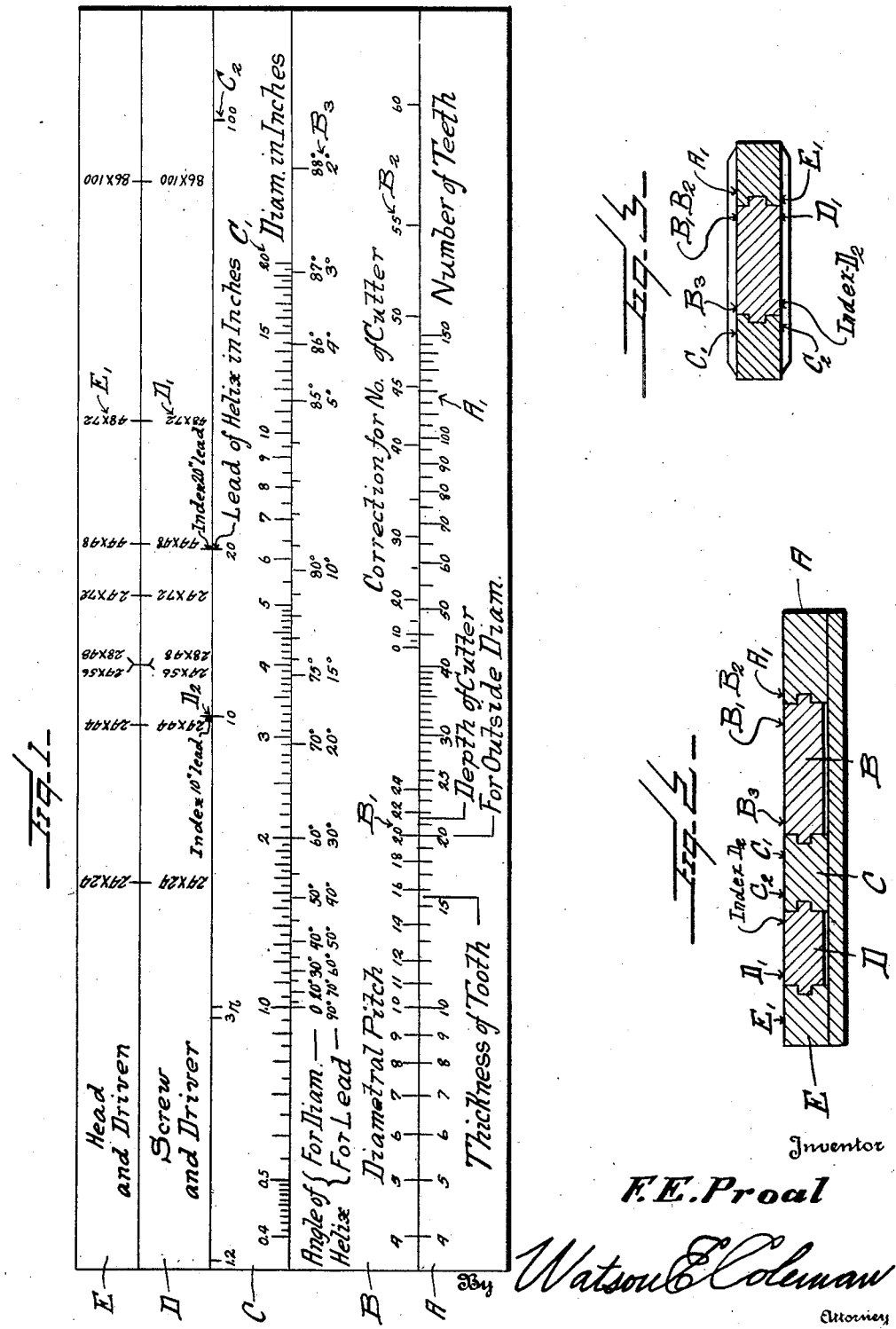

2,087,446

UNITED STATES PATENT OFFICE 2,087,446

SLIDE RULE FOR USE IN GEAR CALCULATIONS

Federico E. Proal, Mexico, D. F., Mexico

Application May 12, 1936, Serial No. 79,321

4 Claims. (Cl. 235—70)

This invention relates to the class of calculating devices and pertains particularly to an improved slide rule designed for use in connection with the cutting of helical or straight toothed gears.

In the calculation of the elements that are involved in the design of a straight or helical gear, it has been the custom heretofore to use different formulas and tables. This method is lengthy and can lead to many errors, especially if the person making the calculation is not very proficient in that particular work.

The present invention has, therefore, for its primary object to provide a novel slide rule by means of which all of the elements of gear calculation are easily and speedily found, allowing a mechanic having no special mathematical training to make all of the calculations necessary for the cutting of a helical or straight toothed gear.

Another object of the invention is to provide an improved slide rule by means of which it is possible not only to determine the elements of the gear required but to determine in association with the specification of the desired gear, the necessary settings to be made on parts of the gear cutting machine and also to quickly and accurately determine the necessary gears to be selected for use in the cutting machine in order that it will operate in the required manner to turn out a gear having the proper form.

The invention will be best understood by reference to the illustrations in the accompanying drawings taken in association with the following description, wherein, in the drawings:

Figure 1 illustrates a rule constructed in accordance with the present invention;

Figure 2 is a view in cross-section of the rule;

Figure 3 is a cross-sectional view of a duplex rule in which the scales illustrated in Figure 1 are distributed on the two faces;

Figure 4 shows a portion of the slide rule structure illustrating a diametral pitch scale on top of which a circular pitch scale has been placed;

Figure 5 is a view illustrating diagrammatically a portion of a gear cutting machine showing the arrangement of the interchangeable gears hereinafter referred to;

Figure 6 is a view looking at the faces of the interchangeable gears and showing their relation.

The actual form of the slide rule is immaterial, as it can be arranged as an ordinary rule in the manner illustrated in Figures 1 and 2, or as the duplex rule of Figure 3, or a circular or cylindrical rule, the principle of operation remaining the same in all cases. The positions which the scales would occupy in the rules illustrated in Figures 2 and 3 are designated in the drawings by similar reference characters hereinafter specifically referred to.

The present rule may also be used in the circular pitch system and in the metric system as will be hereinafter more particularly explained.

A rule embodying the present invention comprises, as illustrated in Figures 1 and 2, the three fixed rules A, C and E and two movable rules B and D, and there may be used in association with the same a glass runner of the usual type, not shown.

The rule A has logarithmically spaced graduations for the number of teeth in the gear and in the example illustrated in Figure 1, begins with four teeth and ends with the 150 tooth graduation. This graduation may be extended either way as may be found suitable, and for convenience and clearness, is marked "Number of teeth."

Between the 15 and 16 tooth graduations and corresponding to a value of $$\frac{\pi \times 10}{2} = 15.708$$

there is a graduation marked "Thickness of tooth." The 20 tooth graduation coincides with a longer graduation marked "For outside diameter" and is used in connection with the calculation of the outside diameter of the gear.

Between the 21 and 22 tooth graduation there is a line marked "Depth of cutter", whose exact value is 21.6 and is used to find the depth of the cut made by the gear cutter to obtain a correct tooth form. This value includes the clearance and is used in finding the circumferential thickness of the tooth.

Rule B has three logarithmically spaced graduations, two in the lower part, sliding against stationary rule A, that are marked in Figure 1, $B_1$ and $B_2$, and an upper graduation sliding against stationary rule C and marked in Figure 1, $B_3$.

Graduation $B_1$ of sliding rule B is divided, as shown in Figure 1, from 4 to 24, and represents the diametral pitch of the gear contemplated. This graduation coincides with the $A_1$ graduations of rule A, when the rule B is in its central or normal position, and said graduation may be marked "Diametral pitch."

Graduation $B_2$ of sliding rule B is divided logarithmically according to the function $$\frac{1}{\cos^3 \alpha}$$

where $\alpha$ is the angle the teeth of the helical gear make with the axis of the gear. In Figure 1, the said graduation $B_2$ starts with 0° and ends with 60° graduation, although it might be extended further. This graduation may be marked "Correction for number of cutter to be used" and is used in conjunction with helical gearing calculations. The position of graduation $B_2$ is immaterial so long as it slides against the fixed graduation $A_1$.

Graduation $B_3$ in slide rule B is graduated according to the function $$\frac{1}{\cos 3\alpha}$$

where $\alpha$ is the angle helical teeth make with the axis of the gear.

The $B_3$ graduation is illustrated with two readings. The upper reading starts with a 0° and runs up to 88° and may be designated or marked "Angle of the helix for diameters". This upper graduation might be colored or tinted the same color as $A_1$, $B_1$ and $C_1$. The lower reading of $B_3$ graduation starts with 90° and ends with 2°. This lower marking of graduation $B_3$ is preferably colored or tinted in a manner to distinguish it from graduations $A_1$, $B_1$ and $C_1$ and the same color as $B_2$, $C_2$, $D_1$ and $E_1$, and is labeled or marked "Angle of the helix for lead" and is used in conjunction with graduation $C_2$.

For convenience, the upper 0° reading which coincides with the lower 90° reading in graduation $B_3$ is made to come directly over the 10 graduation of scale $B_1$. This is not an absolutely essential feature, but is for convenience only.

Graduation $C_1$ in fixed rule C is divided logarithmically and marked as shown in the illustration, the 0.4 division coming directly above the 4 division of graduation $A_1$.

Graduation $C_1$ has more sub-divisions than graduation $A_1$, because it is used in relation with the calculating diameters where it is desirable to have as many sub-divisions as practical. This graduation might be marked "Diameters in inches".

Graduation $C_2$ is divided in exactly the same manner as graduation $C_1$ but it has been shifted so that the $\pi$ or 3.1416 in scale $C_2$ comes directly above the one division of graduation $C_1$.

Graduation $C_2$ may be marked "Lead of spiral in inches".

Sliding rule D has only one graduation in its upper part and one or more index markings in its lower part. These index markings are designated $D_2$. The positions of the index markings $D_2$ on rule D are determined by the constants of the particular make of milling machine upon which the gear is to be cut. A milling machine whose constant is 20 inches means that it has a 20 inch lead of spiral when the dividing head is geared 1 to 1 to the lead screw of the machine table. These parts, the dividing head, lead screw and table, are all standard well-known parts of gear cutting machines and are only diagrammatically illustrated. In that case, the index marking would be set above the 20 inch graduation of scale $C_2$ when the slide D is in its central position. If the milling machine used has a 10 inch constant, the index marking would be placed over the 10 inch graduation of the scale $C_2$ when the rule D is in its central position. For convenience, both index markings have been illustrated and both may be placed upon the rule or either one alone may be used, as found desirable.

Indexes might be marked 10 inch constant or 20 inch constant, etc., or else they may be labeled with the trade-names of the manufacturers whose milling machines have 10 or 20 inch, etc., lead constants.

Graduations in rules D and E depart from ordinary logarithmical graduations inasmuch as they are designed to allow for the rapid calculation of the gear ratios obtained by combining several gears in four different positions.

Manufacturers of milling machines have almost standardized the use of sets of change gears. They generally supply with the milling machine two gears with 24 teeth and one gear of each of the following: 28, 32, 40, 44, 48, 56, 64, 72, 86 and 100 teeth, respectively.

The problem to be solved in selecting the proper gears would, therefore, be mathematically expressed by the formula $$\frac{V \times X}{Y \times Z} = R$$

V, X, Y and Z representing the positions of the four gears in the gear train, as illustrated in Figures 5 and 6, and each one of them susceptible of taking the values of 24, 28, 32, 40, 44, 48, 56, 64, 72, 86 and 100. R in the above formula would represent the ratio of the gear train.

The scales $D_1$ and $E_1$ are graduated so that the graduations will be logarithmically proportional to the product of any two gears and by moving rule D so that the index coincides with the predetermined value of R in scale $C_2$, then any coincidence in the graduations of rules D and E will give the values of V, X, Y and Z.

The positions of the gears will be indicated by the reading of the markings on the rules D and E, which are as follows: "Screw and driver" for rule D, and "Head and driven" for rule E.

The number of teeth of the two gears corresponding to a division in either rules D and E are marked close to the said division and as there is in some cases more than one combination of two gears giving the same result, then the different combinations are marked so as to allow more flexibility to the operator in his choice.

When no coincidence between divisions of graduations $D_1$ and $E_1$ is found, the nearest approximation can easily be located by sight.

In the illustration of the rule as presented in Figure 1 some graduations of scales $D_1$ and $E_1$ have been omitted and the other graduations in the rule have been greatly simplified for the sake of clearness.

The position of scales $D_1$ and $E_1$ relative to the other graduations is immaterial as long as graduations $D_1$ and $E_1$ coincide when the slide D is in its central position. Inasmuch as gear ratios are not susceptible of variation, there are quite a number of cases where a perfect coincidence cannot be attained and then the nearest approximation will give a correct answer or else the problem may be worked backward, modifying one of the elements of the problem so as to allow for more accurate results. This way of finding a solution is very hard to do with ordinary formulas and tables; necessitating complex interpolations and several formulas. In this slide rule, this is very easily accomplished, as will be shown hereinafter.

The actual use of the rule will be best understood by the following two examples, the first of which is for figuring straight or spur tooth gears, and the other for figuring a helical gear.

First example

Given:
    Diametral pitch of gear=20
    Number of teeth of gear=60
Find:
    Pitch diameter
    Outside diameter
    Thickness of tooth at pitch line
    Depth of cut To solve the foregoing, place 20 of $B_1$ over 60 of $A_1$ and read over 0° of upper reading of $B_3$, 3 inches on $C_1$ which is the pitch diameter sought.

For outside diameter, place 20 of $B_1$ over the mark designated "For outside diameter" in graduation or scale $A_1$ and read over 0° in $B_3$, 1 inch on $C_1$. It is necessary to divide this 1 inch by 10 when using scale $C_1$ in conjunction with either of "Thickness of tooth", "Outside diameter" or "Depth of cut" marked in graduations $A_1$, giving the value of 0.1 inch. This quantity 0.1 inch is added to the 3 inch pitch diameter already found giving for the outside diameter 3.1 inches.

The thickness of the tooth is found as follows:
Place 20 of $B_1$ over "Thickness of tooth" in $A_1$ and find 0.785 in $C_1$ over the 0° of $B_3$. Divide 0.785 by 10 and the answer will be 0.0785, as required.

The depth of the cut is found by placing 20 of $B_1$ over "Depth of cut" on $A_1$ scale and find over 0° of $B_3$, 1.08 in $C_1$ which is divided by 10 to give 0.108, which is the answer.

*Second example (helical gear)*

Given:
  Number of teeth 60
  Diametral pitch 20
  Angle of spiral 30°
Find:
  Pitch diameter
  Outside diameter
  Thickness of tooth
  Depth of cut
  Lead of spiral
  Gears to be used and their relative positions assuming a lead constant of 20 inches for the milling machine
  Correction for choosing cutter number

*Pitch diameter.*—Place 20 in $B_1$ over 60 in $A_1$. Using upper $B_3$ graduation and reading above 30° find 3.47 on scale $C_1$ which is the answer.

*Outside diameter.*—Proceed exactly as in straight gear problem until .1 inch is found and add to 3.47, giving an outside diameter of 3.57.

*Thickness of tooth.*—Proceed exactly as in straight gear problem, the result of .0785 being understood to be the normal thickness of the tooth.

*Depth of cut.*—Proceed exactly as in straight gear problem, and the result 0.108 is the correct one for this problem also.

*Lead of spiral.*—Place 20 in $B_1$ over 60 in $A_1$. Place runner over 30° using lower reading of scale $B_3$ and read in scale $C_2$, the answer 18.85.

*Gears to be used.*—Place the 20 inch lead index of rule D over the value 18.85 already found and looking for a coincidence in the various graduations of rules D and E, the following will be found:

| Rule D | Rule E |
| --- | --- |
| 28×40<br>40×56 | 24×44=1st combination<br>44×48=2nd combination |

The mechanic employing the rule in connection with the gear cutting operation will then choose any combination and place the gears in the milling machine as follows:

Using 1st combination, the gear represented by number 28 is placed in the lead screw or driver of the machine in the position indicated by the character V in Figure 5. Gear 40 is placed as an intermediate drive gear in the position X. Gear 24 is placed in the position Z as the driven gear of the head and the gear 44 is placed as an intermediate driven gear in the position Y.

As has been said previously, there are cases where a coincidence might not be attained and the procedure is then as follows:

Move rule D to the nearest coincidence. This will change the position of the index, giving a new corresponding reading of the spiral lead in scale $C_2$ and then work backwards and find a new angle in lower reading of scale $B_3$. With this new helix angle, the other elements can be found as described before, giving an accurate result.

As will be apparent to those proficient in the art, it is much easier to work backwards with a slide rule than it is to do so by mathematical methods, and this is one of the greatest advantages of this slide rule.

Correction for number of cutter: Cutters are manufactured so that for the same pitch only one cutter is the correct one for a certain number of teeth, that is, a cutter of diametral pitch 20 for 60 teeth will not give a correct gear for a 20 tooth gear of the same diametral pitch. As persons acquainted with gear cutting know, the twisting of the teeth requires changing to another cutter adapted for cutting a greater number of teeth, the exact number of which is governed by the formula $$N_1 = \frac{N}{\cos^3 \alpha}$$

$N_1$ being the imaginary number of teeth required; N the actual number of teeth in the gear and $\alpha$ the angle of the spiral.

In applying this to the example, the 0 of $B_2$ is placed over 60 of $A_1$ and under 30 of $B_2$ reading find 92.5. The cutter to be used should be a 20 pitch cutter for cutting 92 teeth instead of 60 teeth, as is the case for a straight or spur gear.

All of the foregoing description and examples given and worked apply only to straight and spiral gear cutting, using the diametral system of gear cutters, but the rule is so designed that a circular pitch gear can be calculated with the change of only one graduation, that is, by changing graduation $B_1$ by means of the following formula:

$$\text{Circular pitch equals} = \frac{\pi}{\text{Diametral pitch}}$$

As an example, for ½ circular pitch, there would be had $$½ = \frac{\pi}{\text{Diametral pitch}}$$

$$\text{Diametral pitch} = \frac{\pi}{½} = 3.1416 \times 2 = 6.2832$$

which means that the ½ inch circular pitch graduation would have to be between the 6 and the 7 exactly at 6.2832 of the original diametral pitch graduation. Other pitches like ⅜, ¼ etc., would be found in the same manner.

It might be convenient to place the circular pitch scale above the diametral pitch scale as illustrated in Figure 4, but the description of this modification was avoided in the first part of the specification in order to make the explanations clearer.

The present rule is also applicable to metric system gear calculation by means of a modification similar to the modification for circular pitch. All scales measuring inches would have to be changed to centimeters and the diametral pitch scale changed to Modulus scale. All the angle scales would remain exactly the same and the working of the slide rule will not be affected by this change.

From the foregoing, it will be apparent that with the present slide rule, the various calculations necessary to be made as a preliminary to cutting straight or spiral gears may be readily made by persons who are to perform the gear cutting operations, much more quickly than would be possible by the use of an ordinary type of slide rule and also without the possibility of error creeping into the calculation as is likely to be the case in using a regular slide rule scale particularly where the user is not very well educated in the use of formulas. It will also be apparent that with the present slide rule, not only will the number of operations or movements necessary to the carrying out of calculations be greatly reduced over what would be required in using a standard form of slide rule, but the finding of the lead of the helix required for cutting a gear of a required size enables the user of the scale to determine quickly and accurately the combination of gears necessary for application to the gear cutting machine to give the proper ratio for the movement of the gear blank relative to the cutter at the proper speed.

What is claimed is:—

1. In a slide rule, means for selecting a correct gear ratio for use in a gear cutting machine, where the lead of the machine spiral is known, comprising a body having two spaced relatively fixed portions, a slide movably held between said portions, a scale of logarithmically spaced graduations upon one of said fixed portions, an index marking upon said slide adjacent said scale representing a constant for said spiral, a scale of values on said slide representing a plurality of pairs of gears, a scale of values upon the other fixed portion representing a plurality of pairs of gears, each pair of gears indicating value coinciding with a like value upon the adjacent scale when the gear value scales are in normal relation, and graduation markings between the said values on one scale and those upon the adjacent scale, the disposition of the index marking adjacent a value representing the known lead of the spiral on the first mentioned scale relatively associating said values to facilitate the selection of a required two pairs of gears.

2. A slide rule for designating the correct gear ratio for use in a spiral gear cutting machine, comprising two fixed rules C and E and a movable rule D, a scale carried by rule C representing advance movement of a helix in linear units of measurement, index marks on rule D coinciding, when the movable rule is in center position relative to the fixed rules, with a value on said scale representing a constant for a particular machine, and a scale upon each of the rules D and E, each division of each of the last mentioned scales designating a pair of gear values and coinciding with a like pair of gear values on the other scale, and said C scale and index being so related that the association of said index mark with a selected division of the C scale will give a reading for a predetermined four gear ratio at the coincidence of two divisions of the D and E rule scales.

3. In a slide rule, means for selecting a required gear ratio for use in a gear cutting machine in which the lead of the machine lead screw is known, comprising three scale carrying units, one of which is movable relative to and interposed between the other two, a scale of logarithmically spaced graduations upon one of said two units, an index marking upon the interposed unit for use in association with said graduations and representing a constant for said lead screw, a scale of values on the other one of said two units indicating ratios of a plurality of pairs of gears, a scale of values upon the interposed unit indicating ratios of a plurality of pairs of gears, each of said gear ratio indicating values coinciding with a like gear ratio value upon the adjacent scale when the interposed unit is in central position relative to the other units, and graduation markings between the ratio values on one gear value scale and those upon the adjacent gear value scale, the relation of said index marking to the logarithmic scale and the ratio values being such that the disposition of the index marking adjacent a graduation upon the first mentioned scale which represents the known lead of the screw will relatively associate said gear ratio values of one scale with those of the other scale facilitate the selection of a required two pairs of gears.

4. In a gear data calculating slide rule having three fixed bars A, C and E, and two sliding bars B and D separating the fixed bars, a logarithmic scale on each of the two bars A and B, said scale divisions being alined when bar B is in central position, said scales A and B representing respectively the number of teeth and diametral pitch for a proposed gear, a logarithmic scale on bar C adjacent bar B on which is read the diameter of the proposed gear, a zero index on bar B adjacent to said C bar scale, index marks on bar A representing constants for tooth thickness, outside diameter of gear and depth of cut, and said indexes and scales being so related as to give all readings on the C scale for pitch diameter, outside diameter, tooth thickness at pitch line and depth of cut at the said zero index on the B scale.

FEDERICO E. PROAL.